United States Patent [19]
Guyot et al.

[11] Patent Number: 6,060,880
[45] Date of Patent: May 9, 2000

[54] HALL EFFECT CONTACTLESS POSITION SENSOR PROVIDING A DIRECT PROPORTION BETWEEN A HALL EFFECT VOLTAGE AND A DISTANCE TO A MAGNETIC TARGET

[75] Inventors: Jean-Christophe Guyot, Les Mureaux; Jean-Yves Frere, Paris, both of France

[73] Assignee: Aerospatiale Société Nationale, Paris, France

[21] Appl. No.: 08/973,754

[22] PCT Filed: May 13, 1997

[86] PCT No.: PCT/FR97/00844

§ 371 Date: Dec. 23, 1997

§ 102(e) Date: Dec. 23, 1997

[87] PCT Pub. No.: WO97/43603

PCT Pub. Date: Nov. 20, 1997

[30] Foreign Application Priority Data

May 15, 1996 [FR] France .................................. 96 06093

[51] Int. Cl.[7] .............................. G01B 7/14; G01B 7/02; G01D 5/14
[52] U.S. Cl. .................................. 324/207.2; 73/DIG. 3; 324/207.26

[58] Field of Search ........................... 324/207.2, 207.21, 324/207.26, 228–230, 235, 252; 307/116, 117; 361/180; 73/DIG. 3

[56] References Cited

U.S. PATENT DOCUMENTS

| 3,440,527 | 4/1969 | Steingroever ............................ 324/230 |
| 3,568,180 | 3/1971 | Rosch . |
| 4,229,696 | 10/1980 | Gustafson ............................ 324/228 X |
| 4,897,914 | 2/1990 | Loubier . |

FOREIGN PATENT DOCUMENTS

| 0110122 | 6/1984 | European Pat. Off. . |
| 0164832 | 12/1985 | European Pat. Off. . |
| 1278293 | 9/1968 | Germany . |
| 0060157 | 5/1977 | Japan .................................. 324/207.2 |

*Primary Examiner*—Gerard Strecker
*Attorney, Agent, or Firm*—Oblon, Spivak, McClelland, Maier & Neustadt, P.C.

[57] ABSTRACT

A contactless position sensor includes a Hall effect cell and a magnetic circuit formed by a permanent magnet and two pole pieces. The magnet and the cell are juxtaposed between the pole pieces. The pole pieces have active surfaces opposite the cell with respect to the magnet. This layout makes it possible to directly obtain an output signal proportional to the distance separating the active surfaces from the target.

8 Claims, 3 Drawing Sheets

HALL EFFECT CONTACTLESS POSITION SENSOR PROVIDING A DIRECT PROPORTION BETWEEN A HALL EFFECT VOLTAGE AND A DISTANCE TO A MAGNETIC TARGET

BACKGROUND OF THE INVENTION

1. Field of the Invention

The invention relates to a contactless position sensor using a Hall effect cell and a specific magnetic circuit making it possible to directly obtain an output signal, whose value varies linearly with the distance separating the sensor from a magnetic target positioned facing the latter.

Such a sensor can be used for any contactless distance measurement, provided that the target is made from a soft ferromagnetic material. Thus, said sensor is independent of the target size and can be used both when the latter is moving and when it is stationary. Therefore the position sensor according to the invention requires no modification of the target, whose position it is desirable to know.

2. Discussion of the Background

Numerous contactless position sensors exist, which are based on different physical principles, whereof in exemplified manner reference is made to optics, ultrasonics, eddy currents, etc.

The choice of a particular sensor is generally made as a function of the nature of the material constituting the target and taking account of the particular conditions under which the measurement has to take place, such as the dimensions of the target, its fixed or mobile nature, the available space, etc.

Numerous existing contactless position sensors are either space-consuming means or require a specific environment making them unsuitable for numerous applications (optical or ultrasonic sensors and the like), or are not very space consuming, but whose output signal must be subject to subsequent electronic processing in order to render it usable (eddy current sensors, etc.).

SUMMARY OF THE INVENTION

The invention specifically relates to a contactless position sensor, whose original design enables it to have reduced overall dimensions and to deliver output signals directly proportional to the distance separating the sensor from the target.

According to the invention, this result is obtained by means of a contactless position sensor using a Hall effect cell and a specific magnetic circuit constituted by a magnet and two pole pieces.

More specifically, the present invention proposes a Hall effect position sensor, characterized in that it comprises a magnet and a Hall effect cell juxtaposed between two pole pieces having, opposite the Hall effect cell relative to the magnet, active surfaces which can be placed at a distance e from a magnetic material target, so that a magnetic flux created by the target is channelled by the pole pieces and distributed on the one hand in the target and on the other, across the Hall effect cell and that the latter then directly delivers an output signal (Va−Vb) proportional to the distance e.

In a preferred embodiment of the invention, the magnet is a permanent magnet delivering a constant magnetic field Ha oriented in a given direction, the active surfaces of the pole pieces being placed in the extension of one another and are oriented parallel to said direction, the Hall effect cell being oriented so as to detect a magnetic induction B oriented parallel to said direction.

In the preferred embodiment of the invention, the pole pieces have two facing, parallel, planar faces, in contact with two opposite, planar parallel faces of the magnet and spaced by the same distance L with respect to the two opposite, planar, parallel faces of the Hall effect cell. The relation:

$$Sa+Sec/L \ll Sent/2e$$

is then satisfied, Sa, Sec and Sent designating the respective cross-sections of the magnet, the Hall effect cell and the air gap separating the active surfaces from the target.

Preferably, the active surfaces of the pole pieces have shapes complimentary of those of a surface facing the target. Thus, said active surfaces can be planar surfaces or cylindrical, concave surfaces, depending on whether the surface facing the target is itself planar or cylindrical.

According to particular arrangements and solely as examples, the sensor can have a circular or rectangular section in a plane parallel to the direction of the magnetic field delivered by the permanent magnet.

BRIEF DESCRIPTION OF THE DRAWINGS

The invention is described in greater detail hereinafter relative to non-limitative embodiments and with reference to the attached drawings, wherein show.

DETAILED DESCRIPTION OF PREFERRED EMBODIMENTS

Figure 1:
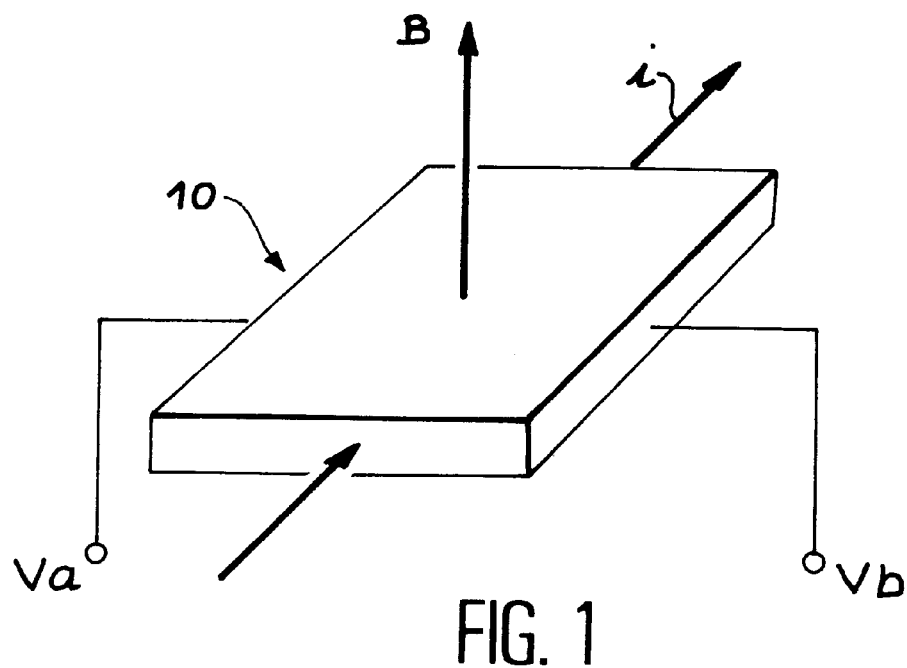
FIG. 1 A perspective view diagrammatically representing a Hall effect cell.

With reference to FIG. 1, it is pointed out that a Hall effect cell is constituted by a parallelepipedic electrically conductive material plate 10, traversed in its lengthwise direction by a bias current i and placed in a magnetic induction field B, which passes through the plate in its thickness direction. Under these conditions, the Hall effect consists of the appearance of a potential difference (Va−Vb), called the Hall voltage, between opposite faces of the plate. This Hall voltage is proportional to the magnetic induction B and a bias current i flowing through it. It is consequently possible to write:

$$Va-Vb = k.i.B \quad (1),$$

in which k represents the Hall constant of the cell.

In practice, the plate 10 has on its ends two opposite connections making it possible to connect it to a power supply, which supplies the bias current i flowing through the plate. On its faces the plate 10 also has two other opposite connections for connecting it to a voltage measuring device such as a voltmeter, which measures the Hall voltage (Va−Vb).

Figure 2:
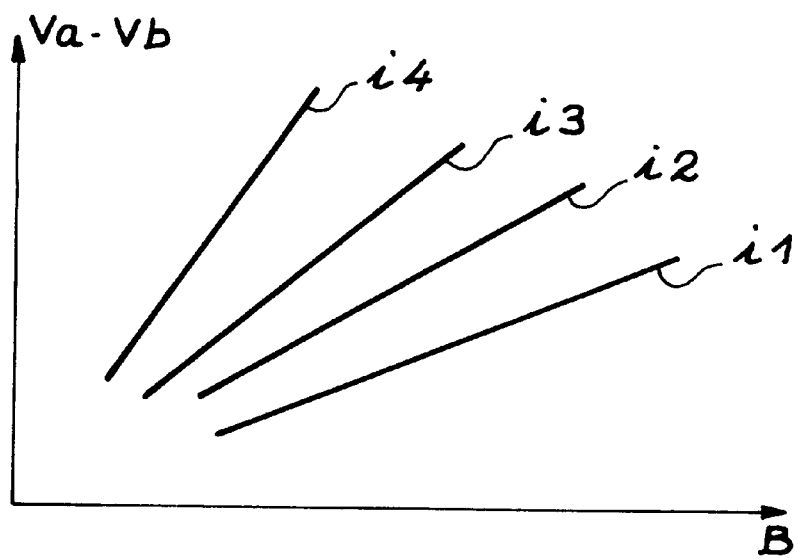
FIG. 2 A curve representing the characteristic Va=Vb=f (B) of a Hall effect cell, for different values of the bias current i traversing it.

As illustrated in FIG. 2 and in accordance with relation (1), the characteristic of a Hall effect cell, i.e. the curve giving the Hall voltage (Va−Vb) as a function of the magnetic induction B, can be modified at random by varying the bias current i. Thus, FIG. 2 shows the characteristics of the Hall effect cell for values of the bias current increasing progressively from a value i1 to a value i4.

Figure 3:
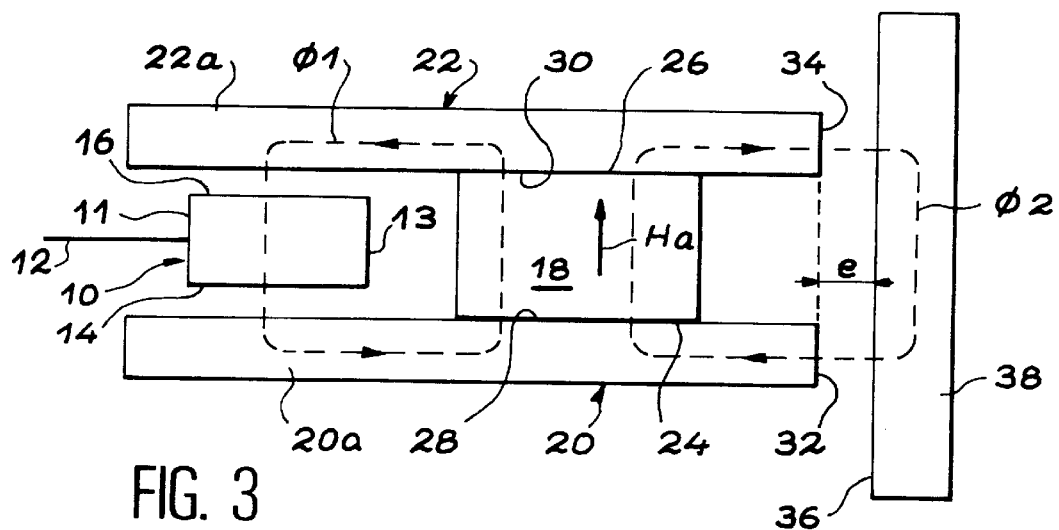
FIG. 3 A sectional view diagrammatically representing a Hall effect position sensor according to the invention.

With reference to FIG. 3, a description will now be given of a Hall effect position sensor according to the invention.

As stated hereinbefore, such a sensor essentially comprises a Hall effect cell and a specific magnetic circuit, whose original design makes it possible to directly obtain output signals, which vary linearly as a function of the distance separating the sensor from the target.

More specifically, FIG. 3 shows a Hall effect cell 10, like that whose principle has been described in conjunction with FIG. 1. Reference 12 designates the different electrical conductors by which said cell 10 is connected to the not shown, power supply, permitting the application thereto of the bias current i, e.g. in a direction perpendicular to the plane of the drawing, as well as to a not shown apparatus used for measuring the Hall voltage (Va−Vb) between the opposite, parallel, planar faces 11 and 13 of the cell 10.

The magnetic circuit associated with said Hall effect cell comprises a permanent magnet 18 and two pole pieces 20, 22 made from a magnetic material.

More specifically, the permanent magnet 18 is parallelepipedic and supplies a constant magnetic field Ha between two opposite, parallel, planar faces 24, 26, whose spacing defines the thickness of the permanent magnet 18.

As illustrated in FIG. 3, the Hall effect cell 10 and permanent magnet 18 are juxtaposed and have a limited spacing from one another. The cell 10 and permanent magnet 18 have a common plane of symmetry, so that the faces 14 and 16 of the cell 10 and the faces 24 and 26 of the permanent magnet 18 are parallel to one another. FIG. 3 also shows that the thickness of the Hall effect cell 10 is significantly smaller than that of the permanent magnet 18.

The pole pieces 20 and 22 are placed on either side of the permanent magnet 18, so as to respectively bear against its faces 24 and 26 by planar, facing faces 28, 30. As will be shown hereinafter, the pole pieces 20 and 22 can also have different geometries without passing outside the scope of the invention.

On considering FIG. 3, it can be seen that the pole pieces 20, 22 are extended beyond the permanent magnet 18 in a direction opposite to the cell 10 with respect to said magnet and are terminated by active surfaces 32, 34. These active surfaces 32, 34 constitute the detection part of the position sensor according to the invention. Thus, through the use of the sensor, said surfaces 32, 34 are positioned facing a surface 36 of a target 38, whose position it is wished to know.

More specifically, the active surfaces 32, 34 of the pole pieces 20, 22 are placed in an extension of one another and are oriented parallel to the direction of the magnetic field Ha delivered by the permanent magnet 18. As will be shown hereinafter, said surfaces 32, 34 are preferably shaped in complementary manner to the surface 36 of the target 38. This characteristic makes it possible to have a substantially uniform distance or spacing e between the active surfaces 32, 34 of the pole pieces and the surface 36 of the target 38.

Opposite said active surfaces 32, 34 relative to the permanent magnet 18, the pole pieces 20, 22 have extensions 20a, 22a, whose dimensioning is such that the Hall effect cell 10 is entirely placed between the planar faces 28, 30 of the pole pieces 20, 32. Bearing in mind the relative dimensioning of the cell 10 and the magnet 18 referred to hereinbefore, the faces 14, 16 of the cell 10 are separated from the respective faces 28, 30 of the pole pieces 20, 22 by the same distance.

As is diagrammatically illustrated in dotted line form in FIG. 3, the magnetic flux created by the magnet 18 is channelled by the pole pieces 20, 22 and is distributed on one side into the target 38 and on the other through the cell 10 forming the Hall effect probe in the form of a leakage flux. The magnetic flux traversing the cell is designated by the reference $\phi1$ and that traversing the target is designated by the reference $\phi2$.

The flux quantity $\phi2$ traversing the target 38 is dependent on the distance e between the active surfaces 32, 34 of the sensor and the target surface 36. The more said distance e decreases, the more flux $\phi2$ increases and vice versa. In view of the fact that the total magnetic flux created by the permanent magnet 18 is constant and equal to the sum of the fluxes $\phi1$ and $\phi2$, the variations of the flux $\phi2$ according to the distance e lead to inverse variations of the flux $\phi1$ traversing the Hall effect cell 10.

The magnetic flux $\phi1$ traversing the Hall effect cell and the magnetic induction B in which is placed said cell are linked by the relation:

$$\phi1 = B.Scel \qquad (2),$$

where Scel designates the passage cross-section of the magnetic flux $\phi1$, i.e. the cross-section of the cell 10 parallel to the faces 11 and 13.

As cross-section S is constant, the magnetic induction in which the Hall effect cell is located is directly proportional to the magnetic flux $\phi1$ and consequently inversely proportional to the magnetic flux $\phi2$.

The relation linking the distance e to the flux $\phi1$ traversing the Hall effect cell is given by the representative equations of the magnetic circuit formed by the sensor illustrated in FIG. 3. This magnetic circuit is shown in detail in FIG. 4. More specifically, in FIG. 4 reference Ra designates the reluctance of the magnet, whilst references Rc and R'c designate the reluctances of the pole pieces 20, 22, respectively on the side of the target 38 and on the side of the Hall effect cell. The target reluctance is designated by the reference Rcible (R target), whilst the equivalent reluctances due respectively the sensor/target air gap and the air gap between the pole pieces on the side of the Hall effect cell are respectively designated Re and Rec. Finally, the reference Ha.La represents the equivalent electromotive force of the permanent magnet 18, Ha corresponding to the magnetic field created by the magnet at its working point, whereas La designates the thickness of the magnet between its faces 24 and 26.

Figure 4:
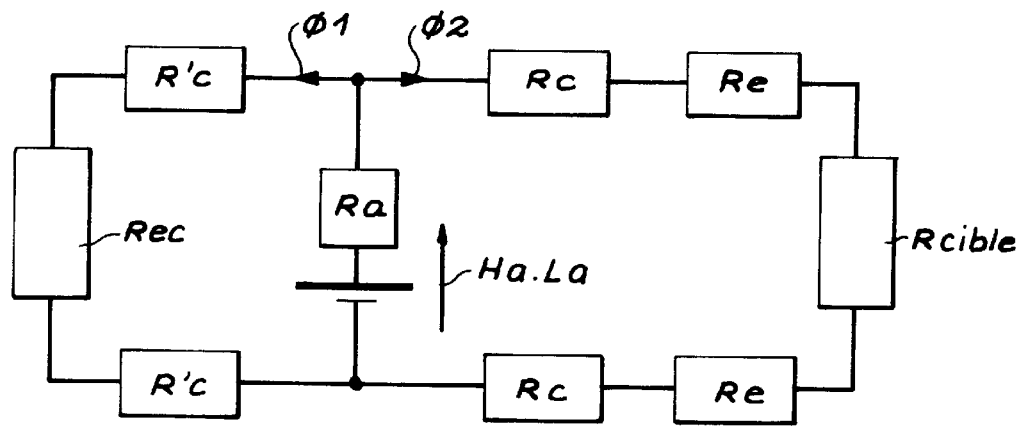
FIG. 4 A view showing the magnetic circuit of the sensor of FIG. 3.
Figure 5:
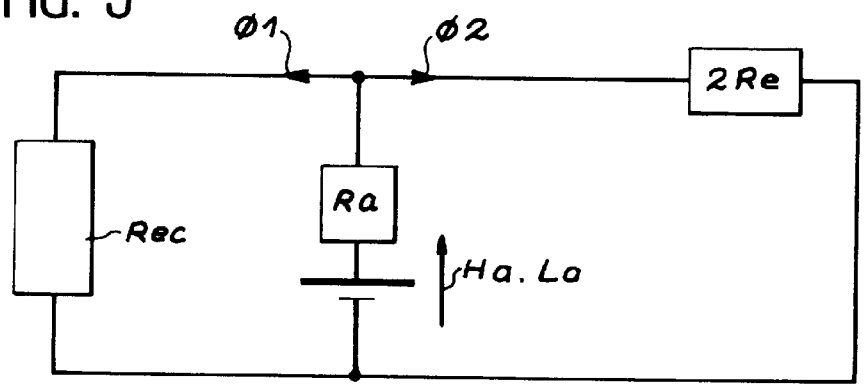
FIG. 5 A view representing the simplified magnetic diagram of the sensor according to the invention.

In the magnetic circuit of FIG. 4, the reluctances Rc, R'c and Rcible of the magnetic parts are negligible compared with those of the air gaps. Consequently the magnetic circuit of FIG. 4 can be reduced to the simplified circuit of FIG. 5, in which all that is left is the reluctance Ra of the magnet and the equivalent reluctances Re and Rec respectively corresponding to the sensor/target air gap and the Hall effect cell air gap.

The equation of the fluxes from this simplified diagram leads to the relation:

$$\phi 1 = \frac{2Re}{2Re(Ra + Rec) + Ra \cdot Rec} \cdot Ha \cdot La. \quad (3)$$

Bearing in mind said relation (3) and relation (2) liking flux $\phi 1$ with the magnetic induction B traversing the Hall cell, relation (1) giving the Hall voltage becomes:

$$Va - Vb = \frac{k \cdot i}{Scel} \cdot \frac{2Re}{2Re(Ra + Rec) + Ra \cdot Rec} \cdot Ha \cdot La. \quad (4)$$

Moreover, on designating $\mu_{ent}$ the permeability of the sensor/target air gap and Sent the cross-section of said air gap, the equivalent reluctance Re due to the sensor/target air gap is linked with the distance e by the relation:

$$Re = \frac{1}{\mu_{ent} \cdot Sent} \cdot e. \quad (5)$$

Taking account of said relation (5) in relation (4) leads to the following equation:

$$Va - Vb = \frac{k \cdot i \cdot Ha \cdot la}{Scel} \cdot \frac{e}{e(Ra + Rec) + u \frac{\mu_{ent} \cdot Sent \cdot Ra \cdot Rec}{2}}. \quad (6)$$

By setting:

$$K1 = \frac{k \cdot i \cdot Ha \cdot la}{Scel}$$

$$K2 = \frac{\mu_{ent} \cdot Sent \cdot Ra \cdot Rec}{2}$$

and $$K3 = Ra + Rec$$

equation (6) becomes:

$$Va - Vb = K1 \cdot \frac{e}{e \cdot K3 + K2}. \quad (7)$$

By choosing the dimensions and materials in such a way that e.K3 is negligible compared with K2, said relation (7) becomes:

$$Va - Vb = \frac{K1}{K2} \cdot e. \quad (8)$$

Consequently, the sensor output signal constituted by the Hall voltage (Va−Vb) is directly proportional to the distance e separating the sensor from the target.

On applying relations like relation (5) to the reluctance Ra of the magnet and to the equivalent reluctance Rec of the air gap corresponding to the Hall effect cell, the linearity condition imposing that e.K3 is negligible compared with K2 is written:

$$\frac{\mu_a \cdot Sa}{La} + \frac{\mu_{ec.} \cdot Sec}{Lec} << \frac{\mu_{ent} \cdot Sent}{2e}, \quad (9)$$

with $\mu_a$ and $\mu_{ec}$, respectively designating the permeability of the magnet and the air gap on the side of the Hall effect cell, Sa and Sec respectively designating the cross-sections of the magnet and the Hall effect cell and Lec designating the thickness of the air gap corresponding to the Hall effect cell.

On choosing the materials in such a way that the permeability $\mu_a$, $\mu_{ec}$ and $\mu_{ent}$ are substantially equal, as are the thicknesses La and Lec, which are then designated by the letter L, the relation (9) becomes:

$$\frac{Sa + Sec}{L} << \frac{Sent}{2e}. \quad (10)$$

The linearity condition of the response of the sensor according to the invention is consequently satisfied as soon as the distance e to be measured is sufficiently small for the condition fixed by relation (10) to be satisfied. It should be noted that the choice of the sensor geometry makes it possible to preserve this condition until relatively high values of the distance e are reached.

Thus, a Hall effect position sensor according to the diagram of FIG. 3 constitutes an apparatus with reduced overall dimensions, which is industrially usable and which directly supplies an output signal proportional to the distance to be measured, without it being necessary to add thereto a random processing circuit.

Figure 6:
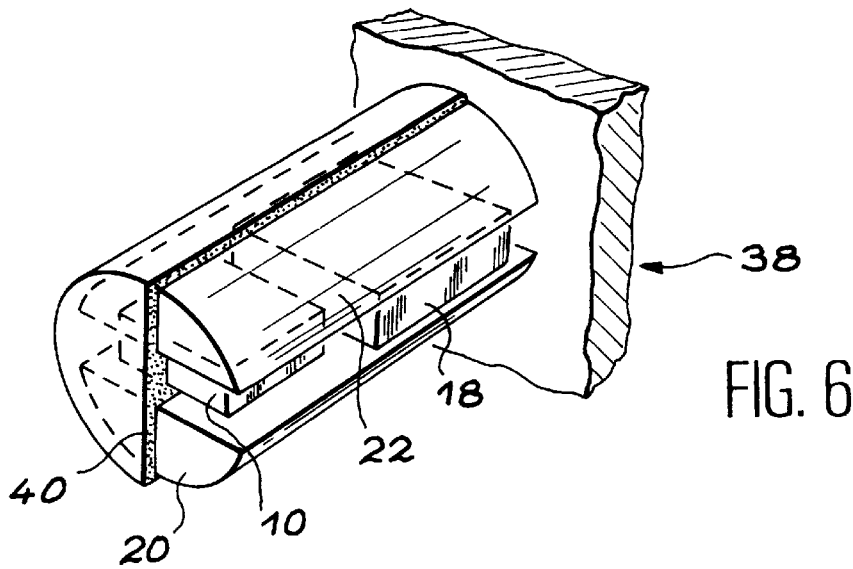
FIG. 6 A perspective view of a first embodiment of the Hall effect position sensor according to the invention.
Figure 7:
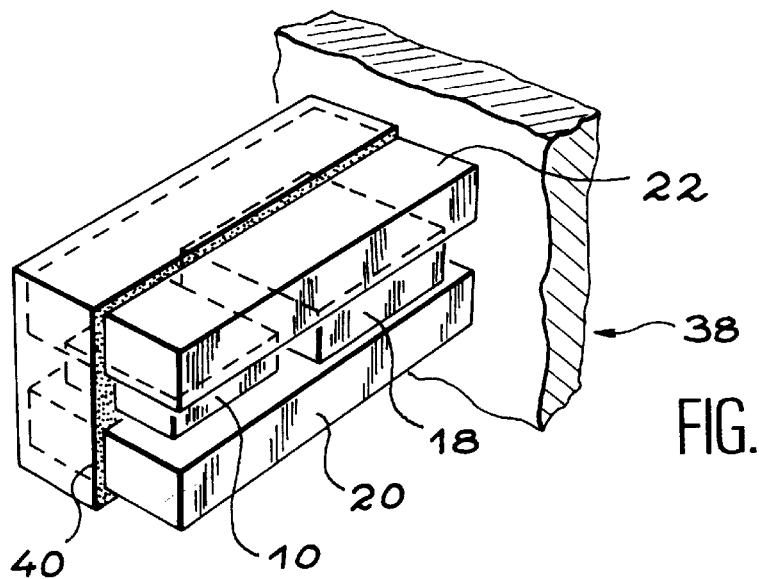
FIG. 7 A perspective view showing another embodiment of the Hall effect position sensor.
Figure 8:
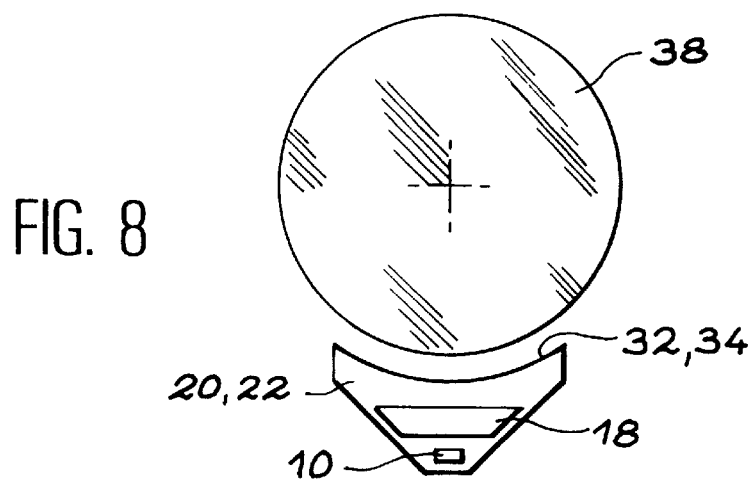
FIG. 8 A plan view illustrating a third embodiment of the Hall effect position sensor according to the invention.

FIGS. 6 to 8 illustrate in exemplified form three possible embodiments of the sensor according to the invention.

In the case of FIG. 6, the sensor has a circular section in accordance with a plane parallel to the direction of the magnetic field Ha and perpendicular to the plane of FIG. 3. In this case, the external surfaces of the pole pieces 20, 22 are located on the same cylindrical surface. FIG. 6 also shows that the cohesion of the sensor is ensured by an electrically insulating material 40, such as a resin, in which are embedded the magnet 18, cell 10 and pole pieces 20 and 22.

In the embodiment illustrated in FIG. 6, the active surfaces of the pole pieces 20, 22 are planar surfaces located in a same plane to be turned towards the target 38.

In another embodiment illustrated in FIG. 7, the sensor has a rectangular section in accordance with a plane parallel to the direction of the magnetic field Ha and perpendicular to the plane of FIG. 3. In this case, the external surfaces of the pole pieces 20, 22 are parallel to the facing faces 28, 30 thereof. Here again, a material 40 such as a resin ensures the cohesion of the different parts of the sensor and the active surfaces of the pole pieces are located in the same plane.

Finally, FIG. 8 shows another embodiment of a sensor according to the invention, applied to the case where the target 38 is a rotary, cylindrical part. As can be seen, the active surfaces 32, 34 of the pole pieces 20, 22 are then concave, cylindrical surfaces complementary of the peripheral surface of the target 38. The portions of the pole pieces closest to the target are then in the form of skids. The measurement performed is consequently distributed over an angular segment, which makes it possible to integrate any defects which may be present on the periphery of the target 38 and very greatly reduce the errors in the signal supplied.

Obviously, the embodiments briefly described hereinbefore with reference to FIGS. 6 to 8 are only given as examples. It is clear that other geometries can be envisaged either for taking account of the target shape, or for taking account of the available space.

What is claimed is:

1. A Hall effect position sensor, comprising:
   two spaced apart parallel pole pieces each having a first length;
   a Hall effect cell positioned between said pole pieces and spaced apart from said pole pieces along a first portion of said first length;

a magnet positioned between said pole pieces along a second portion of said first length; and a magnetic material target positioned at a distance from one end of said first length of said two pole pieces, said one end being proximal to said magnet, whereby a magnetic flux created by said magnet is distributed by said pole pieces to said target material across said distance and across said Hall effect cell to produce in said Hall effect cell an output signal directly proportional to said distance, wherein the pole pieces have two facing, parallel, planar faces, in contact with two opposite, planar, parallel faces of the magnet and spaced by the same spacing L with respect to the two opposite, planar, parallel faces of the Hall effect cell, in which the relation:

$$Sa+Sec/L<<Sent/2e$$

is satisfied, Sa, Sec and Sent designating the respective cross-sections of the magnet, the Hall effect cell and an air gap separating active surfaces of said pole pieces from the magnetic material target, and e designating a distance between the active surfaces of the pole pieces and the magnetic material target.

2. Sensor according to claim 1, wherein:

the magnet is a permanent magnet delivering a constant magnetic field Ha oriented in a given direction, the active surfaces of the pole pieces being placed in an extension of one another and oriented parallel to said direction, and the Hall effect cell is oriented so as to direct a magnetic induction B oriented parallel to said direction.

3. Sensor according to claim 1, wherein the active surfaces of the pole pieces have shapes complementary of those of a facing surface of the magnetic material target.

4. Sensor according to claim 1, wherein the active surfaces of the pole pieces are planar.

5. Sensor according to claim 1, wherein the active surfaces of the pole pieces are concave, cylindrical surfaces.

6. Sensor according to claim 1, having a circular cross-section in a plane parallel to said direction.

7. Sensor according to claim 1, having a rectangular cross-section in a plane parallel to said direction.

8. Sensor according to claim 1, wherein the Hall effect cell, magnet and pole pieces are embedded in a resin.

* * * * *

UNITED STATES PATENT AND TRADEMARK OFFICE
CERTIFICATE OF CORRECTION

PATENT NO. : 6,060,880

DATED : May 9, 2000

INVENTOR(S): Jean-Christophe GUYOT et al.

It is certified that an error appears in the above-identified patent and that said Letters Patent is hereby corrected as shown below:

On the Title Page, Item [54], and Column 1, the Title is incorrect. The Title should read as follows:

--- [54] HALL EFFECT, CONTACTLESS POSITION SENSOR PROVIDING A DIRECT PROPORTION BETWEEN A HALL EFFECT VOLTAGE AND A DISTANCE TO A MAGNETIC TARGET ---

Also on the Title Page, Item [73] the Assignee information is incorrect.
Item [73] should read as follows:

--- [73] AEROSPATIALE SOCIÉTÉ NATIONALE INDUSTRIELLE, Paris, France ---

Signed and Sealed this

Twenty-second Day of May, 2001

*Attest:*

NICHOLAS P. GODICI

*Attesting Officer*   Acting Director of the United States Patent and Trademark Office